United States Patent
Lepel et al.

(10) Patent No.: US 7,548,542 B2
(45) Date of Patent: Jun. 16, 2009

(54) METHODS AND APPARATUS FOR TRANSFERRING DATA

(75) Inventors: Brian Richard Lepel, Rochester, MN (US); Randy Eugenio Oyarzabal, Kasson, MN (US); Susan Eileen Skrabanek, Talking Rock, GA (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 11/122,800

(22) Filed: May 5, 2005

(65) Prior Publication Data

US 2006/0251073 A1 Nov. 9, 2006

(51) Int. Cl.
*H04L 12/28* (2006.01)

(52) U.S. Cl. .............. 370/392; 707/102; 707/104.1

(58) Field of Classification Search .......... None
See application file for complete search history.

(56) References Cited

U.S. PATENT DOCUMENTS

2002/0110119 A1* 8/2002 Fredette et al. ............ 370/389
2004/0044987 A1* 3/2004 Kompalli et al. ........... 717/100
2005/0234969 A1* 10/2005 Mamou et al. ............. 707/102
2006/0074967 A1* 4/2006 Shaburov .................. 707/102

* cited by examiner

*Primary Examiner*—Duc C Ho
(74) *Attorney, Agent, or Firm*—Dugan & Dugan, PC

(57) ABSTRACT

In a first aspect, a method is provided for transferring data. The method includes the steps of (1) receiving information about a location and type of a data source and a location and type of a data destination associated with a first data transfer from the data source to the data destination; (2) receiving information relating data in the data source to data in the data destination; (3) creating a data structure that defines a relationship between the data source and the data destination based on the received information; and (4) employing the data structure for the first data transfer. The data structure is adapted to transfer data from a single table in the data source to multiple tables in the data destination and transfer data from multiple tables in the data source to a single table in the data destination. Numerous other aspects are provided.

23 Claims, 14 Drawing Sheets

FIG. 4

Edit  Close  New Table Definition

Defect Central
Application Definition ( )
Originated by          on

Status: N/A          Classification:

Application Information

| *Application Name | Comments |
|---|---|
| Defect Central | |

| Field Name | Multi | Field Type |
|---|---|---|
| ▼ application | | |
| ☐ Table Definition | | |
| ☐ apsudoimap | | Text |
| ☐ apimapnum | | Text |
| ☐ apdefectid | | Text |
| ☐ apapplname | | Text |
| ▼ defects | | |
| ☐ Table Definition | | |
| ☐ dftitle | | Text |
| ☐ dftargetdt | | Date |
| ☐ dfsysid | | Text |
| ☐ dfstatus | | Text |
| ☐ dfsrcdefid | | Text |
| ☐ dfsite | | Text |
| ☐ dfseverity | | Text |
| ☐ dfrootcd | | Text |
| ☐ dfrootcc | | Text |
| ☐ dfreviewon | | Date |
| ☐ dfreviewby | | Text |
| ☐ dfresolvon | | Date |

▶ Document History

FIG. 5

| Edit | Close | New Field Definition | | | |
|---|---|---|---|---|---|

Defect Central: defects
Table Definition ( )
Originated by on
Status: N/A Classification:

Table Information

| *Table/Form Name | Application | *Order Number |
|---|---|---|
| Defects | Defect Central | 4 |

Field Information

| Field Name | Multi | Field Type |
|---|---|---|
| dfassign | | Text |
| dfassigntm | | Text |
| dfclosedby | | Text |
| dfclosedon | | Date |
| dfcreatedt | | Date |
| dfdefectid | | Text |
| dffailappn | | Text |
| dfgeo | | Text |
| dforigin | | Text |
| dfphase | | Text |
| dfprlority | | Text |
| dfprobrc | | Text |
| dfprobrcd | | Text |
| dfprobtype | | Text |
| dfprocrc | | Text |
| dfproject | | Text |
| dfresolvby | | Text |
| dfresolvon | | Date |

Table Comments

▶ Document History

| Edit | Close |
|---|---|

Defect Central: defects: dfclosedon
Field Definition ( ) on
Originated by
Status: N/A    Classification:

Field Information

| Application | | | Table/Form Name |
|---|---|---|---|
| Defect Central | | | Defects |

| *Field Name | *Field Type | *Multi-value? |
|---|---|---|
| dfclosedon | ⊙ Date   ○ RichText<br>○ Date & Time   ○ Text<br>○ Number | ○ Yes<br>⊙ No |

▶ Document History

Defect Central on U2

Edit | Close

Data Source Definition ( )
Originated by on
Status: N/A    Classification:

Data Source Information

| *Identifier/Name<br>Defect Central on U2 | *Type<br>○ Lotus Notes<br>◉ ODBC<br>○ Text File Destination<br>○ Text File Source | *Application Name<br>Defect Central | DFCID |

| *Data Source Name<br>defect | User Name<br>db2admin | | Password<br>xxxxxxxxxxxxxxxxxxxxxx |

Comments

▶ Document History

METHODS AND APPARATUS FOR TRANSFERRING DATA

CROSS REFERENCE TO RELATED APPLICATIONS

The present application is related to commonly-assigned, U.S. patent application Ser. No. 11/122,800, filed on even date herewith and titled "METHODS AND APPARATUS FOR DEFECT REDUCTION ANALYSIS", which is hereby incorporated by reference herein in its entirety.

FIELD OF THE INVENTION

The present invention relates generally to computer systems, and more particularly to methods and apparatus for transferring data.

BACKGROUND

Existing methods of adapting data from one database for use in another may not be cost-effective. For example, such conventional methods do not support multi-table mapping in which data from a single table in a data source is transferred to multiple tables in a data destination or in which data from multiple tables in the data source is transferred to a single table in the data destination. Other conventional systems for transferring data may require coding for each transfer, and therefore, are complex and expensive to employ and maintain.

Accordingly, improved methods and apparatus for transferring data are desired.

SUMMARY OF THE INVENTION

In a first aspect of the invention, a method is provided for transferring data. The method includes the steps of (1) receiving information about a location and type of a data source and a location and type of a data destination associated with a first data transfer from the data source to the data destination; (2) receiving information relating data in the data source to data in the data destination; (3) creating a data structure that defines a relationship between the data source and the data destination based on the received information; and (4) employing the data structure for the first data transfer. The data structure may be adapted to transfer data from a single table in the data source to multiple tables in the data destination and transfer data from multiple tables in the data source to a single table in the data destination.

In a second aspect of the invention, an apparatus is provided for transferring data. The apparatus includes (1) a memory; and (2) a processor coupled to the memory. The processor is adapted to (a) receive information about a location and type of a data source and a location and type of a data destination associated with a first data transfer from the data source to the data destination; (b) receive information relating data in the data source to data in the data destination; (c) create a data structure that defines a relationship between the data source and the data destination based on the received information; and (d) employ the data structure for the first data transfer. The data structure may be adapted to transfer data from a single table in the data source to multiple tables in the data destination and transfer data from multiple tables in the data source to a single table in the data destination.

In a third aspect of the invention, a system is provided for transferring data. The system includes (1) a data source associated with a first data transfer; (2) a data destination associated with the first data transfer; and (3) an apparatus for transferring data, coupled to the data source and the data destination. The apparatus has a memory and a processor coupled to the memory. The processor is adapted to (a) receive information about a location and type of the data source and a location and type of the data destination associated with the first data transfer from the data source to the data destination; (b) receive information relating data in the data source to data in the data destination; (c) create a data structure that defines a relationship between the data source and the data destination based on the received information; and (d) employ the data structure for the first data transfer. The data structure may be adapted to transfer data from a single table in the data source to multiple tables in the data destination and transfer data from multiple tables in the data source to a single table in the data destination. Numerous other aspects are provided in accordance with these and other aspects of the invention.

Other features and aspects of the present invention will become more fully apparent from the following detailed description, the appended claims and the accompanying drawings.

BRIEF DESCRIPTION OF THE FIGURES

FIG. 4 is a screen capture of a user interface employed by the apparatus for transferring data illustrating a main data transfer screen in accordance with an embodiment of the present invention.

FIG. 5 is a screen capture of the user interface employed by the apparatus for transferring data illustrating an Application entity definition screen in accordance with an embodiment of the present invention.

FIG. 6 is a screen capture of the user interface employed by the apparatus for transferring data illustrating a Table entity definition screen in accordance with an embodiment of the present invention.

FIG. 7 is a screen capture of the user interface employed by the apparatus for transferring data illustrating a Field entity definition screen in accordance with an embodiment of the present invention.

FIG. 10 is a screen capture of the user interface employed by the apparatus for transferring data illustrating a Data Source entity definition screen in accordance with an embodiment of the present invention.

DETAILED DESCRIPTION

The present invention provides improved methods and apparatus for transferring data from a data source to a data destination. A transfer tool may be employed for the transfer. The transfer tool may receive information about the location and type of a data source and information about the location and type of a data destination as input, for example, from a user via a user interface of the tool. Further, the user may employ the user interface to provide information that relates data from the data source to data in the data destination. In this manner, a user may configure a transfer without coding. Based on such information, the transfer tool may be adapted to create a data structure, such as a mapping, defining a relationship between the data source and data destination. The data structure may support multi-table mapping. Such data structure may be employed for the transfer. In some embodiments, the tool may adjust or modify the data and/or log information related to the transfer while transferring the data. Further, in some embodiments, the tool may encrypt password information related to the data.

The data structure created above may be employed for subsequent transfers. In this manner, a user may be required to provide minimal information (e.g., only location information) about a subsequent transfer similar to a previous transfer because the tool may reuse a data structure created for the previous transfer for the subsequent similar transfer. Consequently, after configuring an initial transfer using the tool, a user may easily perform a subsequent similar transfer using the tool without coding such transfer.

Figure 1:
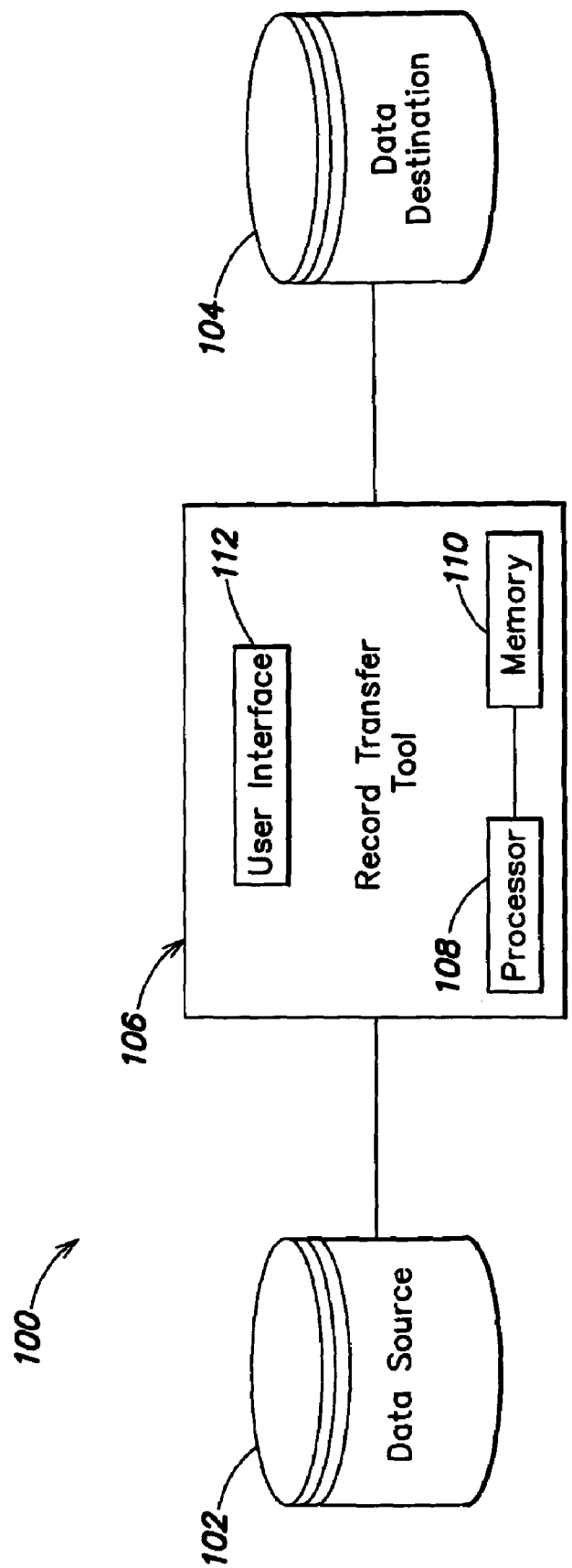
FIG. 1 is a block diagram of a system for transferring data in accordance with an embodiment of the present invention.

FIG. 1 is a block diagram of a system for transferring data in accordance with an embodiment of the present invention. With reference to FIG. 1, the system 100 may include one or more data sources 102 (only one shown) and one or more data destinations 104 (only one shown), both of which are adapted to store data. A data source 102 and/or data destination 104 may be, for example, a DB2 database, Lotus Notes database, Oracle database, SQL Server database, or similar database. Alternatively, the data source 102 and/or data destination 104 may be a text file, spread sheet, or the like. The system 100 includes an apparatus 106 for transferring data coupled to the one or more data sources 102 and the one or more data destinations 104. The apparatus 106 for transferring data may include a processor 108 and memory 110 included therein and/or coupled thereto. The processor 108 is adapted to execute code (e.g., an application) and/or read and write data such that the apparatus 106 may transfer data from a data source 102 to a data destination 104 regardless of the type of the data source 102 and data destination 104. For example, the apparatus 106 may transfer data from a data source 102 that is a Lotus Notes database to a data destination that is a DB2 database. In some embodiments, the apparatus 106 may include a user interface 112 adapted to receive information related to the data transfer. The apparatus 106 is adapted to support multi-table mapping in which data may be transferred from a single table in a data source 102 to multiple tables in a data destination 104 and/or data may be transferred from multiple tables in the data source 102 to a single table in the data destination 104. The apparatus 106 (e.g., an application adapted to be executed by the apparatus 106) may employ an entity-relation model to describe how data is organized and an object-oriented class-relation model to describe how functionality is organized and implemented. An exemplary entity-relation model is described below with reference to FIG. 3, and an exemplary class-relation model is described below with reference to FIGS. 13 and 14.

In some embodiments, the apparatus 106 for transferring data may serve as a defect data or record transfer tool and the data destination 104 may serve as the database structured to be accessible by a defect data analysis tool 116 employed by methods and apparatus for providing a defect reduction analysis methodology. Details of methods and apparatus for providing a defect reduction analysis methodology are described in commonly-assigned, co-pending U.S. patent application Ser. No. 11/122,800, filed on even date herewith and titled "METHODS AND APPARATUS FOR DEFECT REDUCTION ANALYSIS", which is hereby incorporated by reference herein in its entirety.

Figure 2:
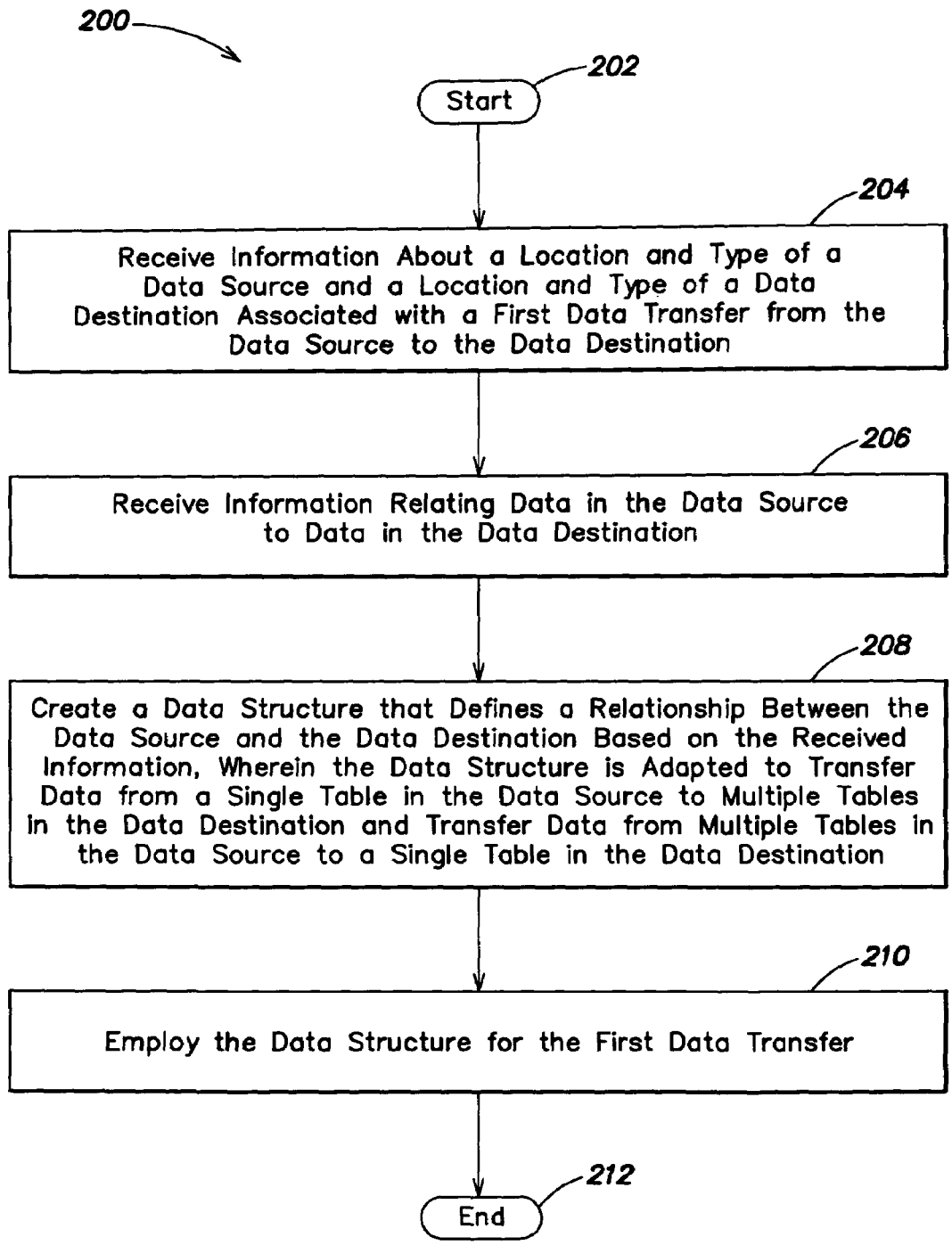
FIG. 2 illustrates a method of transferring data in accordance with an embodiment of the present invention.

Details of the operation of the system 100 for transferring data are now described with reference to FIG. 1 and with reference to FIG. 2 which illustrates a method 200 of transferring data in accordance with an embodiment of the present invention. With reference to FIG. 2, in step 202 the method 200 begins. In step 204, information is received about a location and type of a data source and a location and type of a data destination associated with a first data transfer from the data source to the data destination. For example, the apparatus 106 may receive such information which is provided by a user by answering prompts from the user interface 112. In this manner, the user may employ the user interface 112 to provide information about different entities employed by the apparatus 106 for a data transfer. Exemplary entities employed by the apparatus 106 for transferring data and the relationship among such entities are described below with reference to FIG. 3. Further, screen captures of a user interface 112 employed by the apparatus 106 for transferring data in accordance with an embodiment of the present invention are described below with reference to FIGS. 4-12.

In some embodiments, the user may employ the user interface 112 to provide the apparatus 106 with information such as the name of the computer (e.g., client) serving as the data source 102, name of the computer (e.g., host) serving as the data destination 104, data source structure and/or type (e.g., text file, Lotus Notes database, or the like), data destination type (e.g., text file, Lotus Notes database, or the like), etc. Such information may be stored in a data source document. Alternatively, the user may provide such information associated with the first data transfer by selecting a previously-created data source document. By reusing a previously-created data source document, the user may reduce the time required to configure the first data transfer. In this manner, the apparatus 106 may receive information about the location of the data source 102 and the location of the data destination 104 associated with the first data transfer.

For example, to configure a transfer of defect data (e.g., records) from a customer's defect data collection tool (e.g., UVATS) to a central repository, Defect Central, which is a DB2 database, the user may employ the user interface 112 to specify that a data source of type UVATS is located on UVATS CHW-ODC, which is an instance of UVATS, and to specify that a data destination of type Defect Central is located on host U2.

Further, the user may employ the user interface 112 to provide the apparatus 106 with information such as tables included in the data source (e.g., UVATS), fields included in such tables, a type for such fields, etc. The apparatus 106 may store such information in a table document associated with the data source 102. The user may employ the user interface 112 to provide the apparatus 106 with similar information about the data destination 104 (e.g., Defect Central). The apparatus 106 may store such information in a table document associated with the data destination 104. Alternatively, the user may provide such information associated with the first data transfer by selecting one or more previously-created table documents. By reusing one or more previously-created table documents, the user may reduce the time required to configure the first data transfer. In this manner, the apparatus 106 may receive information about the type of the data source 102 and the type of the data destination 104 associated with the first data transfer.

The information provided by the user and included in the data source document and table documents described above is exemplary. Therefore, the user may employ the user interface 112 to provide a larger or smaller amount of information and/or different information, and consequently, the data source document and/or a table document may include a larger or smaller amount of information and/or different information.

In step 206, information is received relating data in the data source to data in the data destination. The apparatus 106 may receive such information, which is provided by a user by answering prompts from the user interface 112. As stated, in this manner, the user may employ the user interface 112 to provide information about some of the different entities employed by the apparatus 106 for a data transfer. In some embodiments, the user may employ the user interface 112 to provide the apparatus 106 with information about one or more types of mapping that may be employed for relating data in the data source 102 to data in the data destination 104. For example, for a mapping type, a user may employ the user interface 112 to provide information such as how data from one or more tables in the data source 102 maps to one or more tables in the data destination 104 (e.g., information that indicates data in a given field in the data source 102 will be put into which field in the data destination 104). Such information may be stored in a mapping document for that mapping type. In this manner, the apparatus 106 may receive information relating data in the data source 102 to data in the data destination 104. In the example above, the user may specify that a table from TIR, which is an entity in UVATS, maps to two tables in Defect Central.

Alternatively, the user may provide such information relating data in the data source 102 to data in the data destination 104 by selecting one or more previously-created mapping documents. By reusing one or more previously-created mapping documents, the user may reduce the time required to configure the first data transfer. In this manner, the apparatus 106 may receive information relating the data source 102 to the data destination 104 associated with the first data transfer. The information provided by the user and included in one or more mapping documents as described above is exemplary. Therefore, the user may employ the user interface 112 to provide a larger or smaller amount of information and/or different information, and consequently, the one or more mapping documents may include a larger or smaller amount of information and/or different information.

In step 208, a data structure is created that defines a relationship between the data source and the data destination based on the received information. For example, the apparatus 106 may employ the received information to define one or more entities that are employed by the apparatus 106 to define data transfers. The entities may serve as, or form, a data structure that defines the relationship between the data source 102 and data destination 104. In this manner, the data structure may indicate how data from the data source 102, which may be, for example, a first type of database, is to be updated during transfer to the data destination 104, which may be, for example, a second type of database. The data structure may support multi-table mapping. More specifically, the data structure may be adapted to transfer data from a single table in the data source 102 to multiple tables in the data destination 104 and/or transfer data from multiple tables in the data source 102 to a single table in the data destination 104. Such information may be included in the mapping entity. For example, the data structure may take data from a first field of a table in the data source and store such data in a corresponding field of a first table in the data destination. Further, the data structure may take data from a second field of the same table in the data source and store such data in a corresponding field of a second table in the data destination.

In some embodiments, the data structure may indicate whether the apparatus 106 is to add default values to data from the data source 102 during transfer to the data destination 104, whether the apparatus 106 creates logs of the data transfer and/or whether the apparatus 106 encrypts certain data (e.g., password information related to the data, data source 102 and/or data destination 104) during the transfer. However, the data structure may indicate a larger or smaller amount of transfer-related information and/or different transfer-related information.

In step 210, the data structure may be employed for the first data transfer. More specifically, the apparatus 106 may transfer data as indicated by the data structure. In this manner, data from the data source 102 may be transferred to the data destination 104 (e.g., regardless of the structure and type of either the data source 102 and data destination 104 type). During the transfer, the data may be updated to conform to the data destination 104 type. Additionally, one or more portions of the transferred data may be encrypted or otherwise converted/modified (e.g., number or date format may be changed) during the transfer. Additionally or alternatively, the apparatus 106 may log information related to the transfer during the transfer.

The user may employ the user interface 112 to define a transfer request and/or execute a transfer. The user may define the transfer request by providing information such as a data source 102 and data destination 104 (e.g., specific instances of a source and destination data sources), selecting a mapping appropriate for the data source 102 and data destination 104 (e.g., which was created in step 206) and/or providing a selection criteria (e.g., formula) for the source collection indicating information such as a phase, scenario, status or all TIRs (entities of a test tool). The selection criteria may define a set of documents or records for transfer from the data source 102 to the data destination 104. The user may provide a larger or smaller amount of information and/or different information to define the transfer request.

Further, the user may employ the user interface 112 to execute the requested transfer. More specifically, the user may execute the transfer on-demand (e.g., when requested) or may schedule the transfer for execution (e.g., periodically) at a later time. When the apparatus 106 executes a data transfer, the data structure described above may be employed. Additionally or alternatively, in some embodiments, the apparatus 106 may employ an agent for polling for transfer requests from external users.

Thereafter, step 212 may be performed. In step 212, the method 200 of FIG. 2 ends. Through use of the method 200 data may be transferred from one of many types of data sources 102 to a data destination 104 of the same or different type. The transfer supports multi-table mapping. In this manner, data may be transferred from the data source 102 to the data destination 104 such that the data from (e.g., stored in) the data destination may be processed thereafter successfully. Further, the user interface 112 of the apparatus 106 enables a user to configure, request and/or execute a data transfer without coding the transfer.

Figure 3:
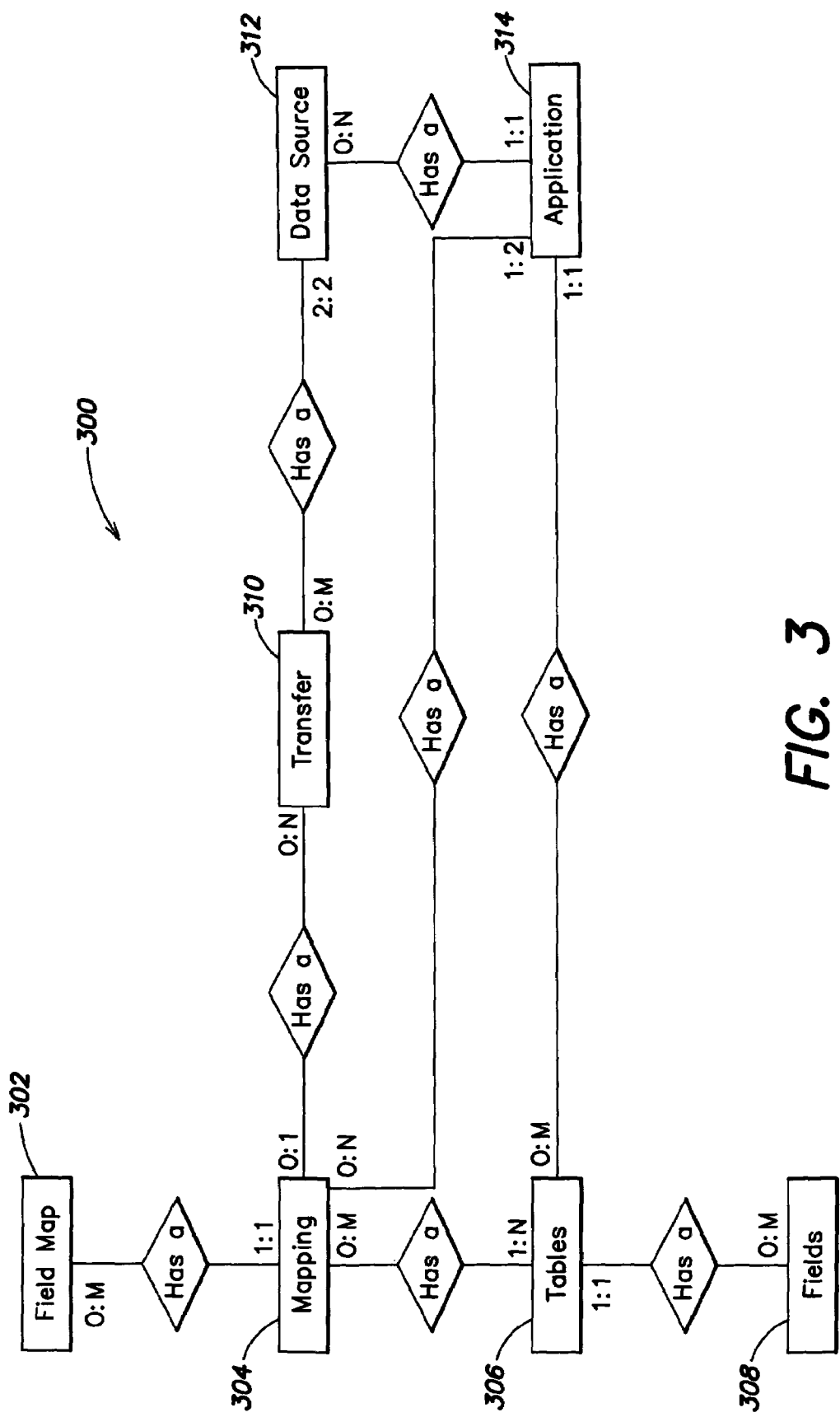
FIG. 3 is an entity-relation diagram illustrating relationships among different entities employed by an apparatus for transferring data in accordance with an embodiment of the present invention.

FIG. 3 is an entity-relation diagram 300 illustrating relationships among different entities employed by an apparatus for transferring data in accordance with an embodiment of the present invention. The apparatus 106 may organize data using a plurality of entities. For example, with reference to FIG. 3, the apparatus 106 may include a Field Map entity 302 which defines individual field mapping and defines default values for fields of data that may need static values. Further, the apparatus 106 may include a Mapping entity 304 which defines a name, source type and destination type of a mapping. The Mapping entity 304 may have a minimum of zero to a maximum of many (M) field maps, and if a field map exists, the field map may be related to a minimum of one to a maximum of one mapping.

The apparatus 106 may include a Tables entity 306 for describing tables available in the application/database to which the Tables entity 306 is associated. The Tables entity 306 may have a minimum of zero and a maximum of many (M) mappings, and if a mapping exists, the mapping may be related to a minimum of one to a maximum of many (N) tables. Further, the apparatus 106 may include a Fields entity 308 defining fields and field types available in a table with which the fields are related. The Fields entity 308 may have a minimum of one to a maximum of one table, and if a table exists, the table may be related to a minimum of zero to a maximum of many (M) fields.

Further, the apparatus 106 may include Transfer entity 310 for defining a transfer request. Such request may be reused for subsequent transfers (e.g., scheduled or ad hoc transfers). The Transfer entity 310 may have a minimum of zero to a maximum of one mapping, and if a mapping exists, the mapping may be related to a minimum of one to a maximum of many (N) transfers. Further, the apparatus 106 may include a Data Source entity 312 for defining the name of a specific instance of an application and the computer (e.g., server) on which the instance is located. The Data Source entity 312 may have a minimum of zero to a maximum of many (M) transfers, and if a transfer exists, the transfer may be related to a minimum of two to a maximum of two data sources (e.g., a source of data and a destination for data).

Additionally, the apparatus 106 may include Application entity 314 for storing application information such as name and type in a generic context. The Application entity 314 may not include a definition of a specific instance location. The Application entity 314 may have a minimum of zero to a maximum of many (N) data sources, and if a data source exists, the data source may be related to a minimum of one to a maximum of one application. Further, the Application entity 314 may have a minimum of zero to a maximum of many (N) mappings, and if a mapping exists, the mapping may be related to a minimum of one to a maximum of two applications. Additionally, the Application entity 314 may have a minimum of zero to a maximum of many (M) tables, and if a table exists, the table may be related to a minimum of one to a maximum of one application.

In this manner, the entities 302-314 of the apparatus 106 may be related, and data may be organized in such entities. It should be understood that the entity-relation diagram above is exemplary and the apparatus 106 may employ a different entity-relation model. Such model may include a larger or smaller number of entities and/or different entities which may be related in the same or a different manner.

Figure 4:
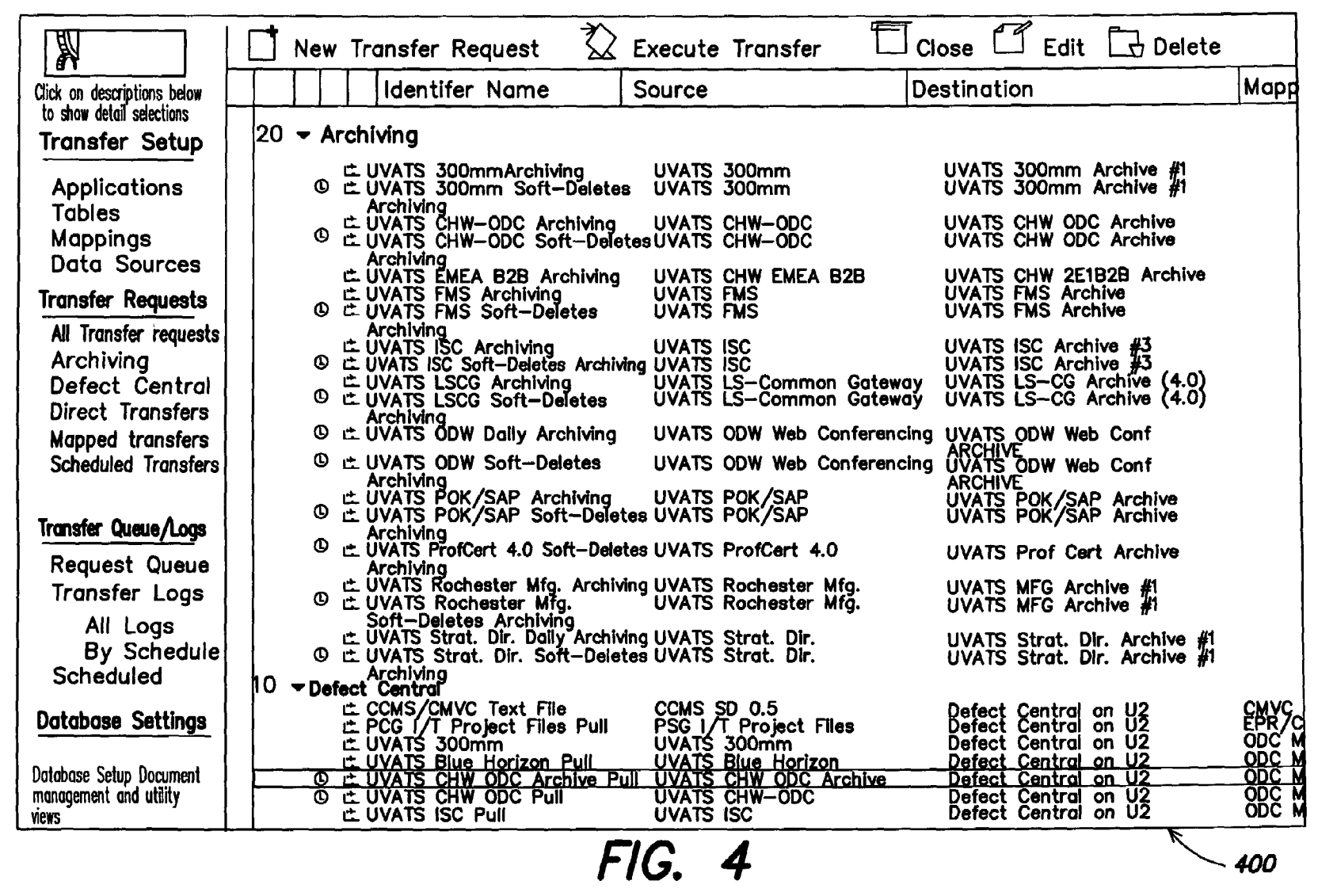

FIGS. 4-12 are screen captures of a user interface 112 employed by the apparatus 106 for transferring data in accordance with an embodiment of the present invention. The user interface 112 may prompt a user for information related to a data transfer. In this manner, the apparatus 106 may receive such data and configure one or more entities 302-314 which may form the data structure employed by the apparatus for the transfer. FIG. 4 is a screen capture of a user interface 112 employed by the apparatus 106 for transferring data illustrating a main data transfer screen 400 in accordance with an embodiment of the present invention. With reference to FIG. 4, a user may employ the screen 400 to provide the apparatus 106 with information related to a transfer configuration, transfer request, queued transfers, transfer logs and/or database settings.

FIG. 5 is a screen capture of the user interface 112 employed by the apparatus 106 for transferring data illustrating an Application entity definition screen 500 in accordance with an embodiment of the present invention. With reference to FIG. 5, a user may employ the screen 500 to provide the apparatus 106 with information related to the Application entity (314 in FIG. 3), and thereby configure the entity.

FIG. 6 is a screen capture of the user interface 112 employed by the apparatus 106 for transferring data illustrating a Tables entity definition screen 600 in accordance with an embodiment of the present invention. With reference to FIG. 6, a user may employ the screen 600 to provide the apparatus 106 with information related to the Tables entity (306 in FIG. 3), and thereby configure the entity.

FIG. 7 is a screen capture of the user interface 112 employed by the apparatus 106 for transferring data illustrating a Fields entity definition screen 700 in accordance with an embodiment of the present invention. With reference to FIG. 7, a user may employ the screen 700 to provide the apparatus 106 with information related to the Fields entity (308 in FIG. 3), and thereby configure the entity.

Figure 8:
FIG. 8 is a screen capture of the user interface employed by the apparatus for transferring data illustrating a Mapping entity definition screen in accordance with an embodiment of the present invention.

FIG. 8 is a screen capture of the user interface 112 employed by the apparatus 106 for transferring data illustrating a Mapping entity definition screen 800 in accordance with an embodiment of the present invention. With reference to FIG. 8, a user may employ the screen 800 to provide the apparatus 106 with information related to the Mapping entity (304 in FIG. 3), and thereby configure the entity.

Figure 9:
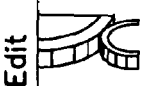
FIG. 9 is a screen capture of the user interface employed by the apparatus for transferring data illustrating a Field Map entity definition screen in accordance with an embodiment of the present invention.

FIG. 9 is a screen capture of the user interface 112 employed by the apparatus 106 for transferring data illustrating a Field Map entity definition screen 900 in accordance with an embodiment of the present invention. With reference to FIG. 9, a user may employ the screen 900 to provide the apparatus 106 with information related to the Field Map entity (302 in FIG. 3), and thereby configure the entity.

FIG. 10 is a screen capture of the user interface 112 employed by the apparatus 106 for transferring data illustrating a Data Source entity definition screen 1000 in accordance with an embodiment of the present invention. With reference to FIG. 10, a user may employ the screen 1000 to provide the apparatus 106 with information related to the Data Source entity (312 in FIG. 3), and thereby configure the entity.

Figure 11:
FIG. 11 is a screen capture of the user interface employed by the apparatus for transferring data illustrating a Transfer entity definition screen in accordance with an embodiment of the present invention.

FIG. 11 is a screen capture of the user interface 112 employed by the apparatus 106 for transferring data illustrating a Transfer entity definition screen 1100 in accordance with an embodiment of the present invention. With reference to FIG. 11, a user may employ the screen 1100 to provide the apparatus 106 with information related to the Transfer entity (310 in FIG. 3), and thereby configure the entity.

Figure 12:
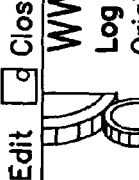
FIG. 12 is a screen capture of the user interface employed by the apparatus for transferring data illustrating a log entry screen in accordance with an embodiment of the present invention.

FIG. 12 is a screen capture of the user interface 112 employed by the apparatus 106 for transferring data illustrating a log entry screen 1200 in accordance with an embodiment of the present invention. With reference to FIG. 12, a user may employ the screen 1200 to provide the apparatus 106 with information related to data transfer logging.

The screens 400-1200 described above are exemplary. Therefore, one or more of the screens 400-1200 may be configured differently such that the screen 400-1200 prompts the user for a larger or smaller amount of information and/or different information.

Figure 13:
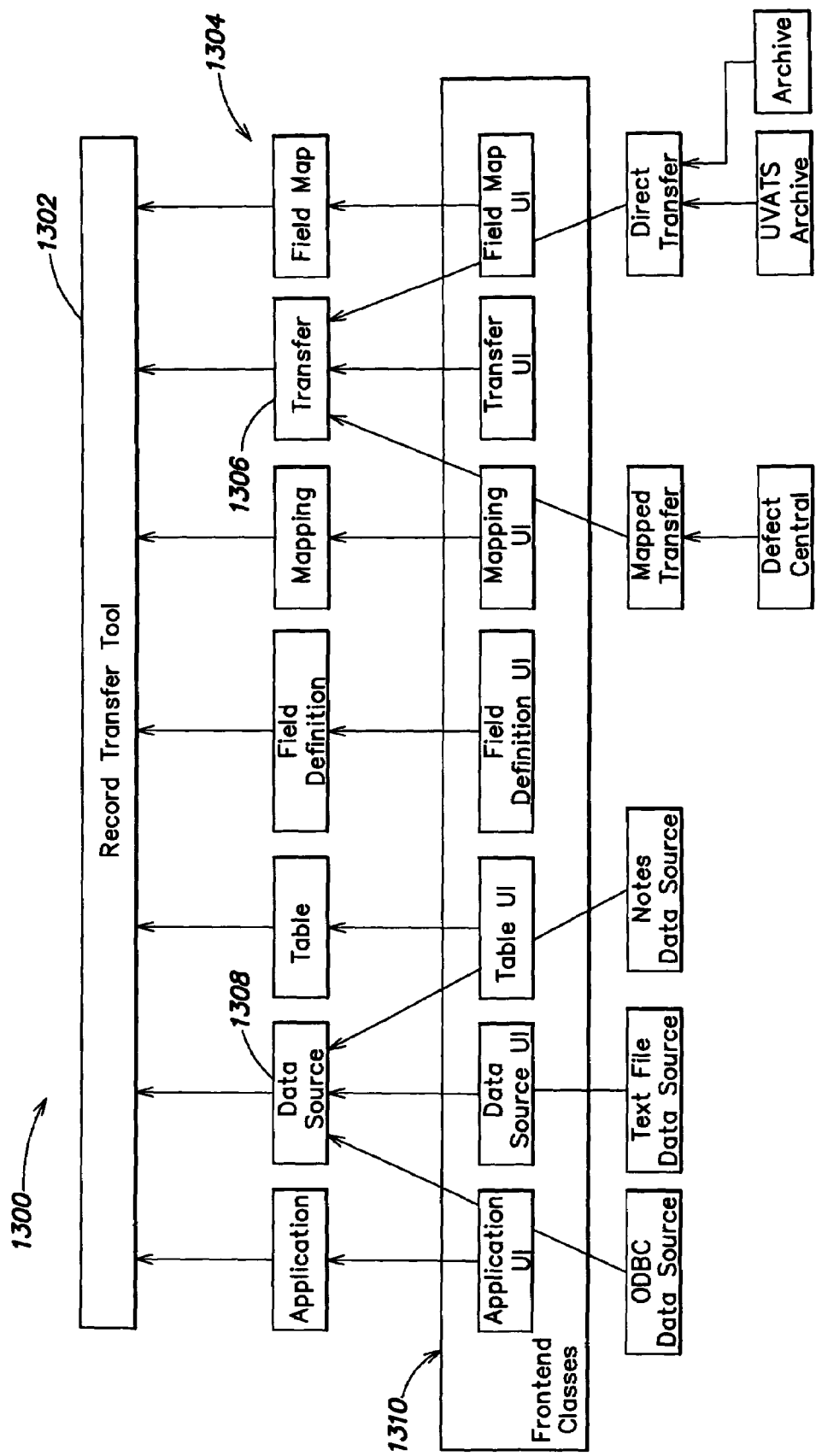
FIG. 13 is a class-relation diagram illustrating a set of relationships among different functional classes employed by an apparatus for transferring data in accordance with an embodiment of the present invention.

FIG. 13 is a class-relation diagram illustrating a set of relationships among different functional classes employed by an apparatus 106 for transferring data in accordance with an embodiment of the present invention. With reference to FIG. 13, the class-relation diagram 1300 illustrates how functionality (e.g., of an application employed by the apparatus 106) is organized in one cohesive object-oriented framework. The functionality may be organized to simply application maintenance. Further, the functionality may be organized to provide extensibility. In this manner, the apparatus 106 may support new data sources (e.g., sources of data and destinations for data) which may be candidates for future data transfers.

Atop the hierarchy in the class-relation diagram 1300 is a parent class, Record Transfer Tool 1302. The Record Transfer Tool class 1302 may include common functionality employed by the apparatus 106. Remaining classes 1304 may support functionality related to individual entities (302-314 in FIG. 3). For example, the Transfer and Data Source class 1306, 1308 greatly enable the apparatus 106 extensibility. Such classes 1306, 1308 may define behavior that may be required for any class 1304 that is extending them. Such classes 1306, 1308 may enable a user (e.g., a programmer of an application employed the apparatus 106) to save time while creating an application extension. More specifically, the user may focus on how to implement the extension rather than what to implement. For example, if a user desires to extend application functionality to support spread sheet files, the user may extend the Data Source class 1308 to implement a specific behavior for reading and writing spread sheets.

In some embodiments, front end classes 1310 may be separated from remaining backend classes. For example, the Lotus Notes application may separate classes in this manner such that multiple copies of the same code may not be required depending on use (e.g., by a front-end interface or a back-end agent). However, in other embodiments, classes may not be separated in this manner.

Figure 14:
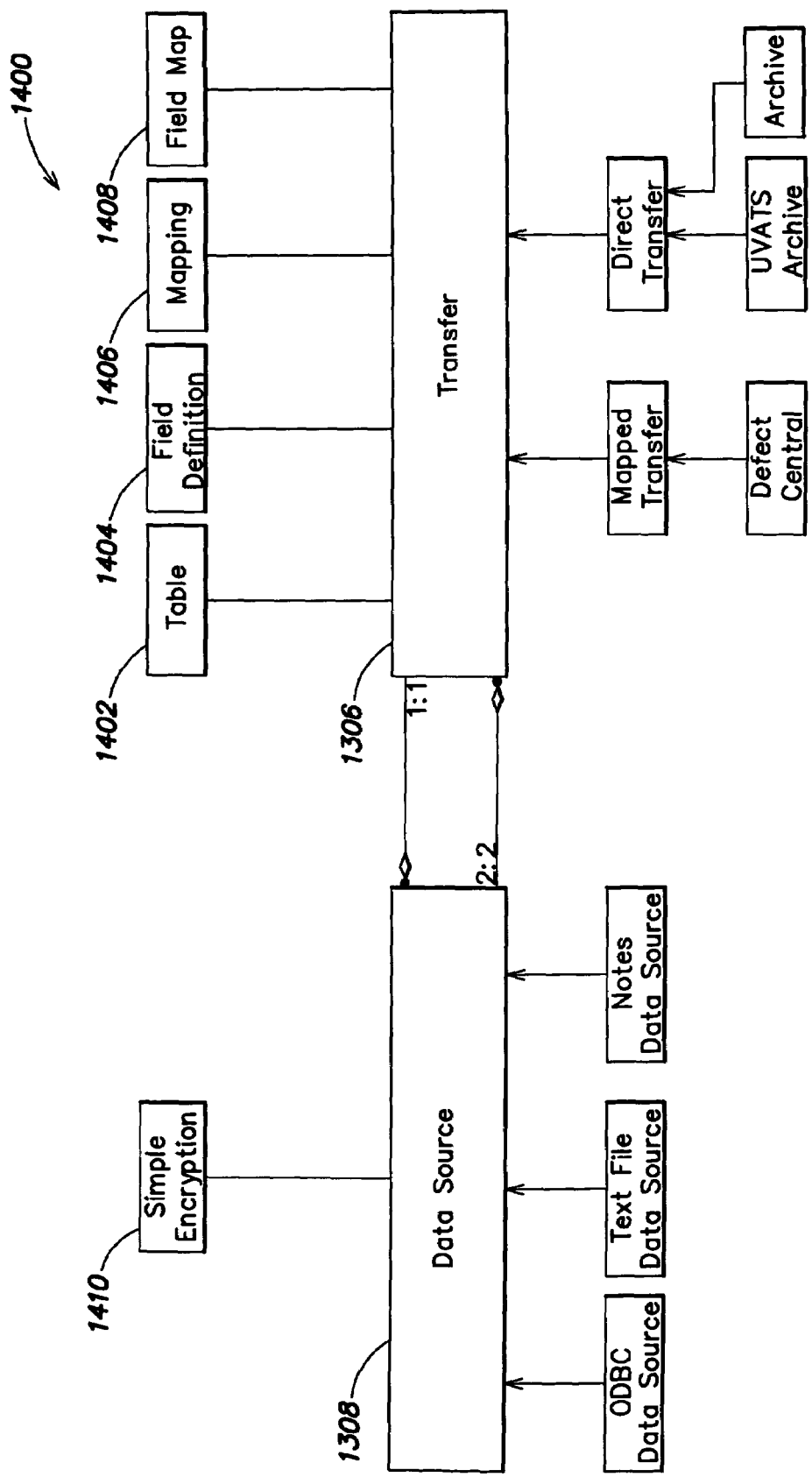
FIG. 14 is a block diagram illustrating additional relationships established by the different functional classes in the class-relation diagram of FIG. 13 in accordance with an embodiment of the present invention.

FIG. 14 is a block diagram illustrating additional relationships established by the different functional classes in the class-relation diagram of FIG. 13 in accordance with an embodiment of the present invention. With reference to FIG. 14, the block diagram 1400 illustrates a relationship between the Transfer and Data Source class 1306, 1308. For example, the Data Source class 1308 may have a minimum of one and a maximum of one instance of a Transfer class 1306. Further, for a transfer, there is a minimum of two and a maximum of two data sources. Additionally, the block diagram 1400 illustrates that a Table class 1402, Field Definition class 1404, Mapping class 1406 and Field Map class 1406 may be related to the Transfer class 1306.

Additionally, as the block diagram 1400 illustrates, the class-relation diagram 1300 may include a utility class, Simple Encryption 1410, which may include functions for encrypting passwords (e.g., before storing). The Simple Encryption class 1410 may be related to the Data Source Class 1308. The Simple Encryption class 1410 enables the user to mask passwords used by the apparatus 106 for transferring data. For example, an ODBC type data source may include user passwords required to query a source. Conventional applications may store such passwords as clear text, thereby exposing such passwords which may be dangerous. In contrast, the apparatus 106 may employ the Simple Encryption class 1410 to encode passwords such that the passwords resemble gibberish. In some embodiments, each password may be encoded based on an integer value for added security. Consequently, no two passwords may encode to the same encryption value, thereby making the encrypted passwords difficult to decode. In this manner, identical passwords may be encoded to different values. Such encoded passwords may then be decoded to real passwords values for use by the application.

The class-relation diagram 1300 and block diagram 1400 described above are exemplary. Therefore, the apparatus 106 may employ a larger or smaller number of classes and/or different classes. Further, the relationship among such classes may be different.

The foregoing description discloses only exemplary embodiments of the invention. Modifications of the above disclosed apparatus and methods which fall within the scope of the invention will be readily apparent to those of ordinary skill in the art. For instance, the present invention may be employed in a variety of programmatic environments and platforms. For example, the present invention may be employed as a standalone or web application. Further, the present invention provides methods and apparatus for transferring data that supports, for example, (1) ODBC compliant sources (e.g., data sources or data destinations), such as DB2, Lotus Notes, Oracle, SQL Server, etc., and text file sources; (2) multi-table mapping; (3) ad hoc transfer (e.g., specifying conditions of what is to be transferred); (4) scheduled transfers; (5) on-demand transfers; (6) background transfers; (7) quick and easy setup or configuration for a new source/destination or a change to a current source/destination (e.g., without requiring coding); (8) defining static (e.g., default) values for a field in a data destination that does not have a corresponding field in the data source; (9) real-time transfers; (10) expansion to support new data formats, such as new text files (e.g., Extensible Markup Language (XML) files, Comma-Separated Values (CSV) files), spread sheets, etc. through an object-oriented application base; (11) reusable databases, tables, fields, sources and/or mapping documents; (12) on-demand DB2 view generation; (13) masking (e.g., via encryption) of data source passwords; (14) error logging (e.g., of non-transferred data for recovery purposes); and/or (15) auto form calculations or refreshes on direct Lotus Notes transfers.

On-demand DB2 view generation may enable the present invention to create a relational view. The relational view may include a selected subset of a database. The relational view may combine data from different tables of the database into a single table. In some embodiments, a defect data analysis tool 116 may require data from a single table. Therefore, the relational view may be useful to the defect data analysis tool 116.

A form is an entity related to a record (e.g., a Lotus Notes document). The form may define one or more record fields and any calculations associated therewith, which may be used while populating the record. The present invention may be adapted to automatically calculate a form as the record is populated.

In this manner, the present invention may provide a solution for transferring data between databases which may easily adapt to virtually any kind of Data Source (e.g., a source of data or destination for data) and make habitual data transfers simple and efficient. Such solution may simplify the transfer process by enabling user to reuse previously-defined database definitions and adapt to database design and/or location changes with minimal effort. More specifically, the present invention employs a design model that breaks down common transfer information into individual reusable components. For example, although related, databases, tables, mappings, data locations may be maintained separately. Further, the present invention may enable a user to quickly and easily define and perform new requests for data transfer without having to write code.

Additionally, the present methods and apparatus may facilitate transfer of non-active records into an archive database and/or migrate records from one database to another. More specifically, the present methods and apparatus may make such transfers simpler and/or faster. In some embodiments, the present methods and apparatus may store (e.g., automatically) statistics related to reusability once a transfer completes. Reusability statistics may include information gathered (e.g., from the service provider) that may indicate an amount of reuse gained from different activities performed. For example, some of the activities may be performed by the service provider and some of the activities may performed (e.g., automatically) by the present invention. The apparatus 106 may be adapted to calculate and/or store the reusability statistics.

Accordingly, while the present invention has been disclosed in connection with exemplary embodiments thereof, it should be understood that other embodiments may fall within the spirit and scope of the invention, as defined by the following claims.

The invention claimed is:

1. A method for transferring data, comprising:
   receiving first information about a location and type of a data source and a location and type of a data destination associated with a first data transfer from the data source to the data destination;
   receiving second information relating data in previously-created mapping documents in the data source to data in the data destination;
   creating a data structure that defines a relationship between the data source and the data destination based on the first and/or second received information; and
   employing the data structure for the first data transfer;
   wherein the data structure is adapted to transfer data from a single table in the data source to multiple tables in the data destination and transfer data from multiple tables in the data source to a single table in the data destination,
   wherein the first and/or second information is received in response to prompting a user for the first and/or second information with a graphical user interface.

2. The method of claim 1 further comprising:
   receiving information about a location and type of a data source and a location and type of a data destination associated with a second data transfer, wherein at least one of the information about the location of the data source, type of the data source, location of the data destination, and type of the data destination associated with the second data transfer is the same as corresponding information associated with the first data transfer; and
   employing the data structure for the second transfer.

3. The method of claim 1 wherein employing the data structure for the first data transfer includes:
   transferring data from the data source to the data destination; and
   while transferring data from the data source to the data destination, updating the data from the data source.

4. The method of claim 3 wherein updating the data from the data source includes inserting a default value in the data for a data destination field that does not correspond to a data source field.

5. The method of claim 1 further comprising logging information related to the first data transfer.

6. The method of claim 1 further comprising encrypting password information related to at least one of the data, data source and data destination.

7. The method of claim 6 wherein encrypting password information related to at least one of the data, data source and data destination includes encrypting the password information to a unique value.

8. The method of claim 1 wherein employing the data structure for the first data transfer includes, in response to a request to initiate the first data transfer, employing the data structure for the first data transfer in a non-batch mode.

9. The method of claim 1 wherein:
   the data source is one of a text file, spread sheet, DB2 database, Lotus Notes database, Oracle database, and SQL Server database; and
   the data destination is one of a text file, spread sheet, DB2 database, Lotus Notes database, Oracle database, and SQL Server database.

10. An apparatus for transferring data, comprising:
    a memory; and
    a processor, coupled to the memory, and adapted to:
    receive first information about a location and type of a data source and a location and type of a data destination associated with a first data transfer from the data source to the data destination;
    receive second information relating data in previously-created mapping documents in the data source to data in the data destination;
    create a data structure that defines a relationship between the data source and the data destination based on the first and/or second received information; and
    employ the data structure for the first data transfer;
    wherein the data structure is adapted to transfer data from a single table in the data source to multiple tables in the data destination and transfer data from multiple tables in the data source to a single table in the data destination,
    wherein the apparatus is further adapted to receive the first and/or second information in response to prompting a user for the first and/or second information with a graphical user interface.

11. The apparatus of claim 10 wherein the processor is further adapted to:
    receive information about a location and type of a data source and a location and type of a data destination associated with a second data transfer, wherein at least one of the information about the location of the data source, type of the data source, location of the data destination, and type of the data destination associated with the second data transfer is the same as corresponding information associated with the first data transfer; and employ the data structure for the second transfer.

12. The apparatus of claim 10 wherein the processor is further adapted to:
transfer data from the data source to the data destination; and
while transferring data from the data source to the data destination, update the data from the data source.

13. The apparatus of claim 12 wherein the processor is further adapted to insert a default value in the data for a data destination field that does not correspond to a data source field.

14. The apparatus of claim 10 wherein the processor is further adapted to encrypt password information related to at least one of the data, data source and data destination.

15. The apparatus of claim 10 wherein the processor is further adapted to, in response to a request to initiate the first data transfer, employ the data structure for the first data transfer in a non-batch mode.

16. The apparatus of claim 10 wherein:
the data source is one of a text file, spread sheet, DB2 database, Lotus Notes database, Oracle database, and SQL Server database; and
the data destination is one of a text file, spread sheet, DB2 database, Lotus Notes database, Oracle database, and SQL Server database.

17. A system for transferring data, comprising:
a data source associated with a first data transfer;
a data destination associated with the first data transfer; and
an apparatus for transferring data, coupled to the data source and the data destination, and having:
a memory; and
a processor, coupled to the memory, and adapted to:
receive first information about a location and type of the data source and a location and type of the data destination associated with the first data transfer from the data source to the data destination;
receive second information relating data in previously-created mapping documents in the data source to data in the data destination;
create a data structure that defines a relationship between the data source and the data destination based on the first and/or second received information; and
employ the data structure for the first data transfer;
wherein the data structure is adapted to transfer data from a single table in the data source to multiple tables in the data destination and transfer data from multiple tables in the data source to a single table in the data destination,
wherein the processor is further adapted to receive the first/and or second information in response to prompting a user for the first and/or second information with a graphical user interface.

18. The system of claim 17 wherein the processor is further adapted to:
receive information about a location and type of a data source and a location and type of a data destination associated with a second data transfer, wherein at least one of the information about the location of the data source, type of the data source, location of the data destination, and type of the data destination associated with the second data transfer is the same as corresponding information associated with the first data transfer; and
employ the data structure for the second transfer.

19. The system of claim 17 wherein the processor is further adapted to:
transfer data from the data source to the data destination; and
while transferring data from the data source to the data destination, update the data from the data source.

20. The system of claim 19 wherein the processor is further adapted to insert a default value in the data for a data destination field that does not correspond to a data source field.

21. The system of claim 17 wherein the processor is further adapted to encrypt password information related to at least one of the data, data source and data destination.

22. The system of claim 17 wherein the processor is further adapted to, in response to a request to initiate the first data transfer, employ the data structure for the first data transfer in a non-batch mode.

23. The system of claim 17 wherein:
the data source is one of a text file, spread sheet, DB2 database, Lotus Notes database, Oracle database, and SQL Server database; and
the data destination is one of a text file, spread sheet, DB2 database, Lotus Notes database, Oracle database, and SQL Server database.

* * * * *